US012774814B2

(12) United States Patent
Greene et al.

(10) Patent No.: US 12,774,814 B2
(45) Date of Patent: Oct. 27, 2026

(54) REGENERATIVE COOLING AND ADJUSTABLE THROAT FOR ROTATING DETONATION ENGINE

(71) Applicant: RTX Corporation, Farmington, CT (US)

(72) Inventors: Christopher Britton Greene, Hebron, CT (US); James M. Donohue, Glastonbury, CT (US); Peter AT Cocks, South Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/388,360

(22) Filed: Nov. 9, 2023

(65) Prior Publication Data

US 2024/0077028 A1 Mar. 7, 2024

Related U.S. Application Data

(62) Division of application No. 17/231,487, filed on Apr. 15, 2021, now Pat. No. 11,852,077.

(51) Int. Cl.
*F23R 7/00* (2006.01)
*F02C 3/24* (2006.01)
(Continued)

(52) U.S. Cl.
CPC .................. *F23R 7/00* (2013.01); *F02C 3/24* (2013.01); *F02C 5/02* (2013.01); *F02C 7/264* (2013.01); *F23R 3/32* (2013.01); *F23R 3/44* (2013.01); *F23R 3/56* (2013.01); *F02C 5/00* (2013.01); *F02K 7/02* (2013.01); *F05D 2240/36* (2013.01); *F05D 2250/141* (2013.01);
(Continued)

(58) Field of Classification Search
CPC ...... F02C 5/00; F02C 5/02; F23R 7/00; F02K 7/02
See application file for complete search history.

(56) References Cited

U.S. PATENT DOCUMENTS 3,646,761 A * 3/1972 Norman .................... F02K 7/10 60/767
4,097,820 A 6/1978 Hill et al.
(Continued)

FOREIGN PATENT DOCUMENTS

CN 109578168 A 4/2019

*Primary Examiner* — Gerald L Sung
(74) *Attorney, Agent, or Firm* — Bachman & LaPointe, P.C.

(57) ABSTRACT

A method for operating a rotating detonation engine, having a radially outer wall extending along an axis; a radially inner wall extending along the axis, wherein the radially inner wall is positioned within the radially outer wall to define an annular detonation chamber having an inlet and an outlet, wherein the method includes flowing liquid phase fuel along at least one wall of the radially inner wall and the radially outer wall in a direction from the outlet toward the inlet to cool the at least one wall and heat the liquid fuel to provide a heated liquid fuel; flowing the heated liquid fuel to a mixer at the inlet to reduce pressure of the heated liquid fuel, flash vaporize the heated liquid fuel and mix flash vaporized fuel with oxidant to produce a vaporized fuel-oxidant mixture; and detonating the mixture in the annular detonation chamber.

11 Claims, 3 Drawing Sheets

(51) Int. Cl.

| | |
|---|---|
| ***F02C 5/02*** | (2006.01) |
| ***F02C 7/264*** | (2006.01) |
| ***F23R 3/32*** | (2006.01) |
| ***F23R 3/44*** | (2006.01) |
| ***F23R 3/56*** | (2006.01) |
| *F02C 5/00* | (2006.01) |
| *F02K 7/02* | (2006.01) |

(52) U.S. Cl.
CPC .... *F05D 2260/232* (2013.01); *F05D 2260/99* (2013.01); *F23R 2900/03043* (2013.01)

(56) References Cited

U.S. PATENT DOCUMENTS

| | | | | |
|---|---|---|---|---|
| 7,775,460 | B2 | 8/2010 | Berg et al. | |
| 7,784,267 | B2 * | 8/2010 | Tobita | C23C 4/126 60/39.38 |
| 7,966,803 | B2 | 6/2011 | Chapin et al. | |
| 7,980,056 | B2 | 7/2011 | Rasheed et al. | |
| 9,816,463 | B2 | 11/2017 | Falempin et al. | |
| 11,480,136 | B1 | 10/2022 | Smith | |
| 2004/0118104 | A1 * | 6/2004 | Koshoffer | F02K 7/075 60/204 |
| 2004/0128974 | A1 * | 7/2004 | Laper | F02C 5/02 60/39.6 |
| 2006/0016171 | A1 * | 1/2006 | Renggli | F02K 1/386 60/204 |
| 2006/0042228 | A1 * | 3/2006 | Venkataramani | F02K 7/005 60/226.1 |
| 2007/0180814 | A1 | 8/2007 | Tangirala et al. | |
| 2012/0131901 | A1 | 5/2012 | Westervelt et al. | |
| 2014/0182295 | A1 | 7/2014 | Falempin | |
| 2014/0260323 | A1 * | 9/2014 | Dierksmeier | F16C 32/044 60/803 |
| 2018/0180289 | A1 | 6/2018 | Lavertu, Jr. et al. | |
| 2018/0231256 | A1 | 8/2018 | Pal et al. | |
| 2018/0356093 | A1 | 12/2018 | Pal et al. | |
| 2018/0363555 | A1 | 12/2018 | Zelina et al. | |
| 2019/0264917 | A1 * | 8/2019 | Pal | F23R 7/00 |
| 2020/0040843 | A1 * | 2/2020 | Pal | F02K 7/10 |
| 2021/0164660 | A1 | 6/2021 | Dyson et al. | |

* cited by examiner

REGENERATIVE COOLING AND ADJUSTABLE THROAT FOR ROTATING DETONATION ENGINE

CROSS-REFERENCE TO RELATED APPLICATIONS

This application is a divisional of U.S. patent application Ser. No. 17/231,487 filed Apr. 15, 2021.

GOVERNMENT LICENSE RIGHTS

This invention was made with government support under contract number FA8650-18-D-2062, Task Order FA8650-18-F-2077 awarded by the United States Air Force. The government has certain rights in the invention.

BACKGROUND

The disclosure relates to rotating detonation engines and, more particularly, to cooling and expansion of operability range of same.

A rotating detonation engine (RDE) includes an annulus with an inlet end through which a fuel and air mixture enters and an outlet end from which exhaust exits. A detonation wave travels in a circumferential direction of the annulus and consumes the incoming fuel and air mixture. The burned fuel and air mixture (e.g., combustion gases) exits the annulus as an exhaust flow.

The detonation wave provides a high-pressure region in an expansion region of the combustion. Rotating detonation pressure gain combustion systems can have significant advantages over other alternatives including pulse detonation pressure gain combustors.

An RDE is generally operated at a high equivalence ratio. Further, since detonation is in an annulus defined between an inner and an outer wall, both walls are beneficially cooled. Thus, thermal management is a significant challenge in detonation engines. Detonation in the combustion annulus causes a high heat flux on the walls of the detonation and exhaust cavity. As a result, the walls may overheat unless aggressively cooled.

RDEs such as ramjet RDEs also require fast vaporization of fuel and mixing with air in order to sustain high velocity detonation. Further, such engines are faced with the dual challenge of accommodating a wide operability range along with the pressure-flow balancing required for stable rotating detonation.

SUMMARY

In one non-limiting configuration, the present disclosure related to a method for operating a rotating detonation engine, having a radially outer wall extending along an axis; a radially inner wall extending along the axis, wherein the radially inner wall is positioned within the radially outer wall to define an annular detonation chamber having an inlet and an outlet, the method comprising: flowing liquid phase fuel along at least one wall of the radially inner wall and the radially outer wall in a direction from the outlet toward the inlet to cool the at least one wall and heat the liquid fuel to provide a heated liquid fuel; flowing the heated liquid fuel to a mixer at the inlet to reduce pressure of the heated liquid fuel, flash vaporize the heated liquid fuel and mix flash vaporized fuel with oxidant to produce a vaporized fuel-oxidant mixture; and detonating the mixture in the annular detonation chamber.

In another non-limiting configuration, the heated liquid fuel is a super-heated liquid fuel.

In still another non-limiting configuration, the fuel is selected from a group consisting of aviation fuel, $CH_4$, $C_2H_4$ and combinations thereof.

In a further non-limiting configuration, the detonating induces a rotating detonation wave around a circumference of the annular detonation chamber.

In a still further non-limiting configuration, the flowing liquid phase fuel comprises flowing the liquid phase fuel along the radially outer wall.

In another non-limiting configuration, the flowing liquid phase fuel comprises flowing the liquid phase fuel along both the radially outer wall and the radially inner wall.

In still another non-limiting configuration, the flowing the liquid phase fuel to a mixer comprises maintaining pressure of the liquid phase fuel sufficient to maintain a liquid state of the liquid phase fuel.

In a further non-limiting configuration, the flowing the heated liquid fuel to a mixer comprises flowing the heated liquid fuel through at least one fuel orifice.

In a still further non-limiting configuration, the at least one fuel orifice is downstream of an inlet for the oxidant.

In another non-limiting configuration, the at least one fuel orifice is upstream of an inlet for the oxidant.

In still another non-limiting configuration, the outlet is defined between a static structure and a moveable flow restriction, and further comprising adjusting flow area through the outlet during operation of the rotating detonation engine by moving the moveable flow restriction.

In a further non-limiting configuration, a rotating detonation engine comprises a radially outer wall extending along an axis; a radially inner wall extending along the axis, wherein the radially inner wall is positioned within the radially outer wall to define an annular detonation chamber having an inlet for fuel and oxidant and an outlet; wherein the outlet is defined between a static structure and a moveable flow restriction defining a flow area through the outlet, and wherein movement of the moveable flow restriction changes the flow area.

In a still further non-limiting configuration, the static structure comprises a conical section defined by the radially inner wall, and the moveable flow restriction is movable relative to the conical section.

In another non-limiting configuration, movement of the moveable flow restriction relative to the conical section is along the axis.

In still another non-limiting configuration, movement of the moveable flow restriction relative to the conical section is along a radius substantially transverse to the axis.

In a further non-limiting configuration, the moveable flow restriction is movably mounted on the radially outer wall.

In a still further non-limiting configuration, the annular detonation chamber has an annular height (H), the annular height (H) increases downstream through the outlet, and the moveable flow restriction extends from one of the radially inner wall and the radially outer wall toward the other of the radially inner wall and the radially outer wall, and has a height (h) that is less than the annular height (H).

The present disclosure may include any one or more of the individual features disclosed above and/or below alone or in any combination thereof.

BRIEF DESCRIPTION OF THE DRAWINGS

A detailed description follows, with reference to the accompanying drawings, wherein.

DETAILED DESCRIPTION

The disclosure relates to rotating detonation engines and more particularly to a method for regenerative cooling of a rotating detonation engine (RDE) that utilizes fuel to absorb heat from the RDE and then utilizes the heat absorbed by the fuel and a pressure drop to flash vaporize the fuel, resulting in effective thermal management as well as a good fuel-oxidant mixture.

Figure 1:
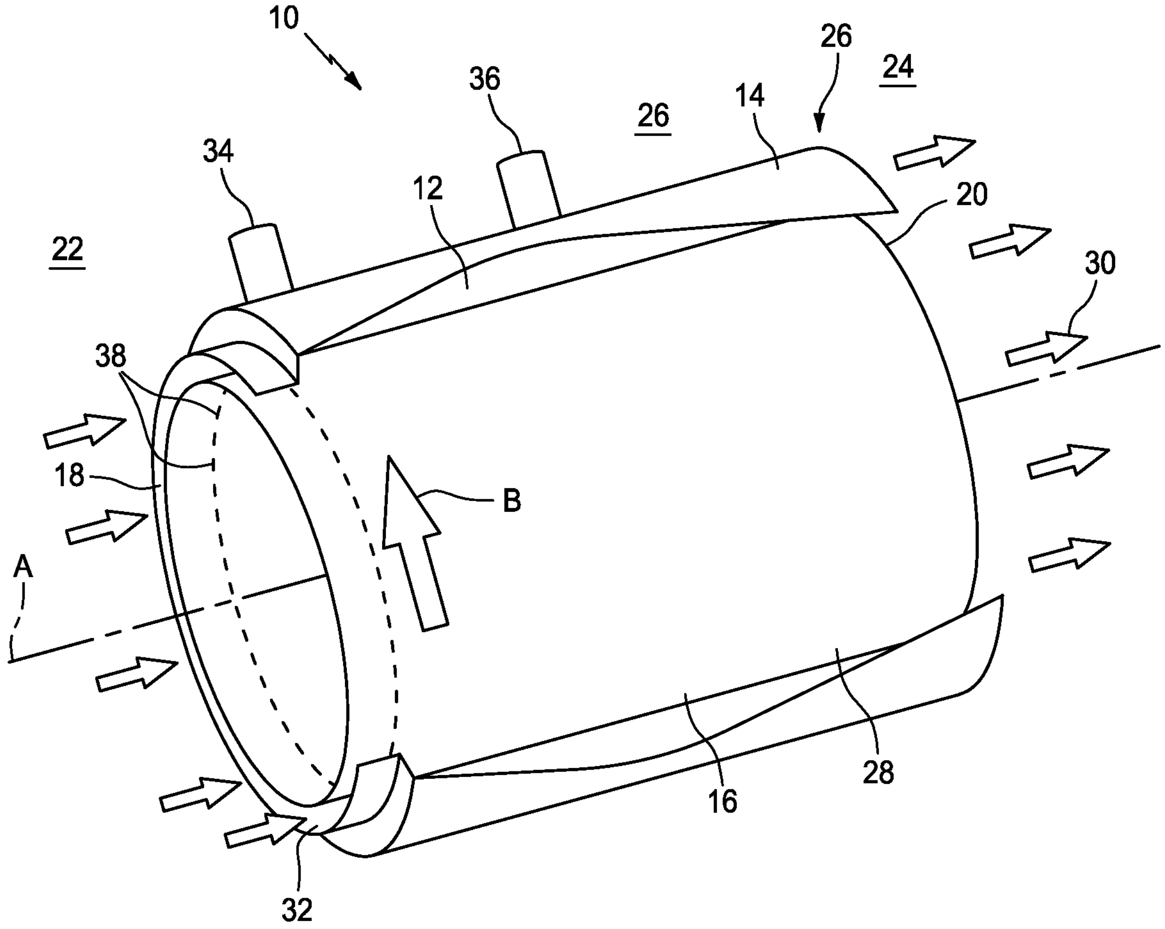
FIG. 1 schematically illustrates a rotating detonation engine.

FIG. 1 is a schematic and simplified diagram of an RDE 10. As seen in FIG. 1, RDE 10 includes a detonation chamber 12, defined between a radially outer wall 14 and a radially inner wall 16. Detonation chamber 12 is an annular combustor or combustion chamber, and has an inlet 18 and an outlet 20. Fuel and oxidant, collectively referred to as reactants, are introduced to the inlet 18 in various manners. RDE 10 may be defined by an upstream end 22 and a downstream end 24, which refers to the general direction of flow of the reactants through RDE 10. RDE 10 can be cylindrical as shown. The axis A of the cylinder is illustrated in FIG. 1. The longitudinal extent of RDE 10 is the extent along the longitudinal axis A. The upstream end 22 and downstream end 24 may be referred to as the two axial ends of RDE 10. Detonation chamber 12 is defined by radially outer wall 14, which can be the inner wall surface of a housing 26, and radially inner wall 16, which can be the outer wall surface of a centerbody 28 defined along axis A. Accordingly, detonation chamber 12 has an annular cross section. It is possible for RDE 10 to have a shape other than that of a cylinder and for detonation chamber 12 to have a cross section other than annular (and hence for the continuous detonation wave to traverse a path that is other than circular). For simplicity, RDEs described herein will generally be described as cylindrical with annular detonation chambers (and hence with the continuous detonation wave propagating in a circumferential direction, or circular path, around the detonation chamber).

It will be understood that any feature or embodiment described herein, although described in the context of a cylindrical RDE with annular detonation chamber, may be in a non-cylindrical RDE with non-annular detonation chamber, unless specifically indicated to the contrary.

In operation, once a detonation wave is initiated in RDE 10, the detonation wave continues in a circumferential direction around the annular detonation chamber 12, as shown by arrow B in FIG. 1. Fuel and oxidizer can be continually injected into detonation chamber 12 in order to sustain the detonation wave. The detonation products are ejected or exhausted out of the exit or downstream end 24 (as indicated by the generally horizontal, rightward pointing arrows 30 shown at the right side of FIG. 1) to produce thrust or extract work.

Detonation is a combustion process consisting of a shock wave coupled to and sustained by a trailing combustion front. The wave speed is on the order of thousands of meters per second, compared with a flame speed on the order of tens of meters per second for deflagration. This built-in compression and rapid heat release of detonation result in lower entropy gain, and thus higher thermodynamic efficiency, as compared to deflagration, given the same initial conditions.

It should be noted that the use of the term "detonation chamber" as used herein does not mean that no non-detonative combustion ever occurs. Rather, non-detonative combustion may occur, and may even regularly occur, in a detonation chamber of an RDE. The term "combustion chamber" may also be used in this disclosure to refer to a detonation chamber of an RDE. RDE 10 may include a nozzle (not shown in FIG. 1) at the downstream end 24. Fuel and oxidant can be introduced in various ways, for example directly through an inlet 32 to detonation chamber 12, or through injector inlets 34, 36, or openings 38. Alternatively, one or more of injector inlets 34, 36 can be used to initiate detonation.

Detonation and the detonation wave circulating at high speed around annular detonation chamber 12 can generate a very large amount of heat or thermal load that must be managed in order to avoid overheating.

Figure 2:
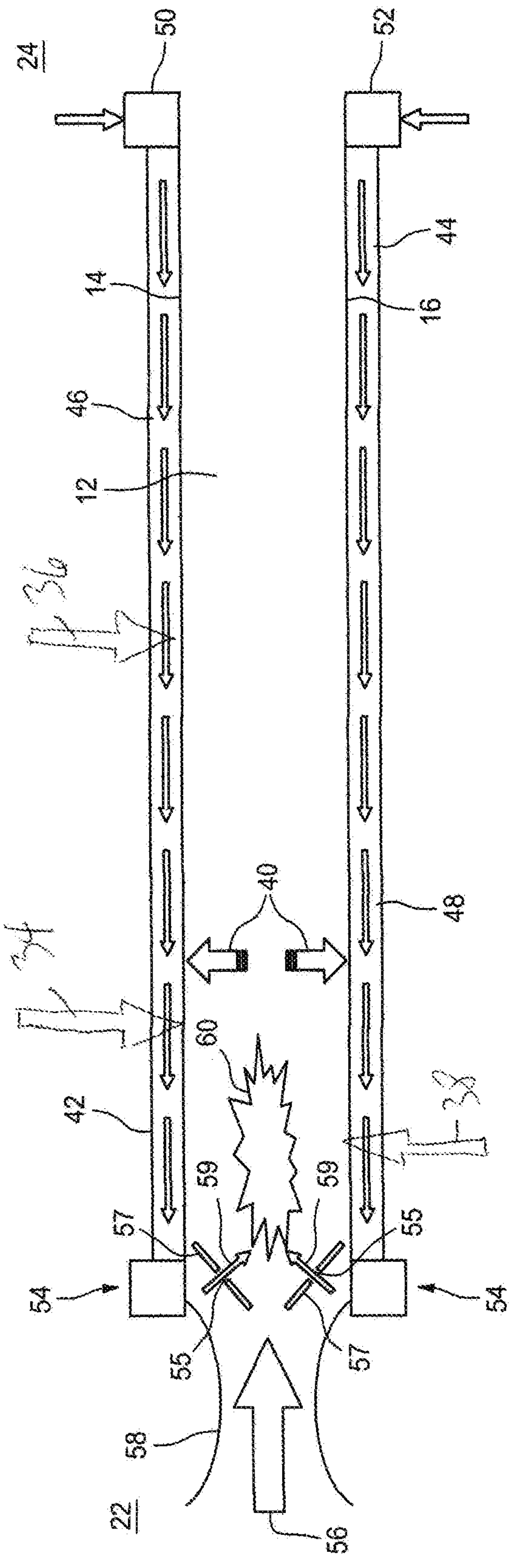
FIG. 2 illustrates a non-limiting configuration of a method for regenerative cooling of a rotating detonation engine.

FIG. 2 is a schematic cross-section taken through a portion of radially outer wall 14 and radially inner wall 16 and shows annular detonation chamber 12. Combustion within chamber 12 gives off a substantial amount of heat as schematically shown by arrows 40. In order to manage this heat and prevent overheating, a coolant can be circulated along either or both of radially outer wall 14 and radially inner wall 16. In the configuration shown in FIG. 2, liquid fuel can be used as this coolant. This liquid fuel as coolant can be in place of or in addition to any fuel that is introduced via inlet 32, injector inlets 34, 36 or openings 38 as discussed with respect to FIG. 1.

FIG. 2 schematically shows a cooling jacket 42 positioned outside radially outer wall 14, and another cooling jacket 44 positioned radially inside of radially inner wall 16. Cooling jackets 42, 44 define flow passages 46, 48 along walls 14, 16. Coolant can be passed through these flow passages to cool walls 14, 16.

FIG. 2 also illustrates inlets 50, 52 to passages 46, 48, and these inlets are positioned at the downstream or outlet side of detonation chamber 12. Coolant can be fed to inlets 50, 52 in the form of a liquid fuel. Liquid fuel can be advantageous as a coolant because most liquid fuels have a large capacity to absorb heat. Further, this contributes to efficient thermal management as the heat, when absorbed into the fuel, is useful in ultimate detonation of the fuel mixed with oxidant. Coolant in the form of liquid fuel is passed from inlets 50, 52 along passages 46, 48 from a downstream end 24 toward upstream end 22, and maintained under pressure so that a heated liquid fuel reaches a mixer schematically illustrated at 54, at upstream end 22. At this stage, the heated liquid fuel is super-heated liquid fuel or nearly super-heated liquid fuel, or supercritical fuel, that is, heated above the boiling point or critical point of the liquid fuel.

FIG. 2 also schematically illustrates oxidant, in this case a flow of air 56 passing through an inlet nozzle 58. Incoming air can be generated by velocity of the vehicle carrying engine 10, for example in the case of a ramjet or scramjet, or can be driven by a fan or other device. Air 56 contains oxygen gas (O2) and should be immediately understood as containing O2. Air 56 is mixed with heated liquid fuel from mixer 54 under conditions where the heated liquid fuel is also exposed to a pressure drop, and a flash vaporization of the heated liquid fuel occurs, resulting in a mixture 60 of flash-vaporized fuel and oxidant reaching annular detonation chamber 12 where detonation of the mixture generates and/or maintains the rotating detonation waves circulating at high speed through chamber 12. Mixer 54 can include various mixer components and also serves to turn flow from the generally upstream direction of flow through passages 46, 48, toward an inlet area to annular detonation chamber 12. Further, mixer 54 can include at least one fuel orifice through which flow of fuel represented by arrow 59 can be passed to accomplish the desired pressure drop of heated liquid fuel. Fuel orifices 55 in FIG. 2 are shown defined in walls schematically illustrated at 57. In this non-limiting configuration, air 56 flows between walls 57 and contacts fuel (arrows 59) passing through fuel orifices 55. It should be appreciated that fuel orifices can be positioned either upstream or downstream of the inlet or inlets for air, or both upstream and downstream of these inlet(s). Air 56 is shown in FIG. 2 being introduced through inlet nozzle 58 upstream of fuel orifices 55, but air can also be introduced through inlet 32, injector inlets 34, 36 or openings 38 as shown in FIG. 1 (inlets 34, 36 and openings 38 also schematically illustrated in FIG. 2), and in this manner could be introduced downstream of fuel orifices 55 in addition to, or instead of, upstream. In this way, fuel can be used to absorb heat from detonation chamber 12 and prevent overheating, while also preparing the fuel for efficient detonation.

Figure 3:
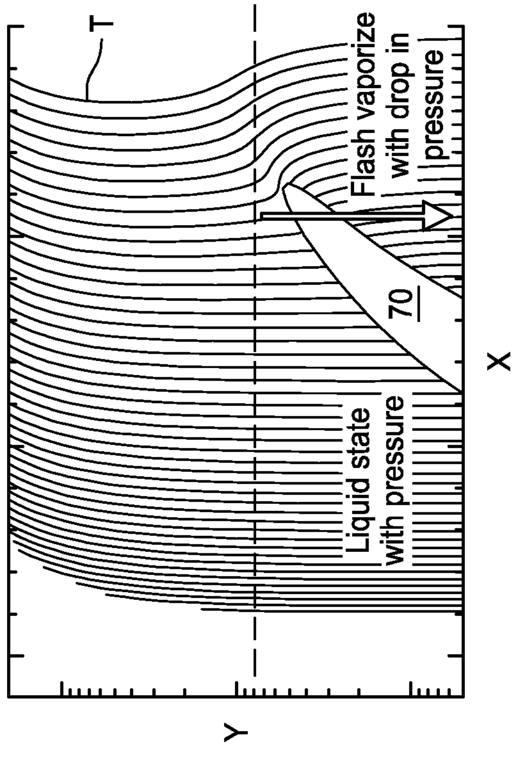
FIG. 3 illustrates a phase diagram showing a flash vaporization as disclosed herein.

It is desirable to phase change or flash the fuel directly from the liquid state passing through the cooling jackets to the vapor phase for mixing with oxidant and detonation. Different types of fuels have different phase change behavior that can be illustrated in a phase change diagram such as is shown in FIG. 3. In FIG. 3, the x-axis is enthalpy, for example in BTU/lb., and the y-axis is pressure, for example in psi. The isotherms represent temperatures, for example in ° F. A two phase dome 70 is shown and represents an area where the fluid represented by the diagram exists in both liquid and gas phases. In one non-limiting configuration of the disclosure, it is desirable to proceed directly from liquid to gas phase. Thus, if at a temperature for a fluid that passes through the two phase dome 70, it is advantageous to ensure a sufficient pressure drop that the fluid reaches the gas phase on the lower side of the dome.

It should be appreciated that the specific contours of isotherms as well as the shape and size of the two phase dome will be different for different fluids. Nevertheless, the diagram shown in FIG. 3 is representative of various fluids relevant to the present disclosure, which could be aviation fuels such as Jet A or Jet A-1, or $CH_4$, $C_2H_4$, $H_2$ and the like. Aviation fuels are typically hydrocarbon based fuels comprising mixtures of hydrocarbons typically having short carbon chains. Of these fuels, Jet A and Jet A-1 refer to aviation fuels conforming to ASTM specification D1655. The specific fuel to be utilized can depend upon whether engine 10 is a ground based or fixed installation, or intended as an engine for aviation. With proper pressure and temperature management, each of these fuels and others can be utilized as disclosed herein to absorb heat and then flash vaporize to produce efficient and stable detonation.

Referring back to FIG. 2, it should be appreciate that cooling jackets 42, 44 and passages 46, 48 defined thereby can have different structures, for example as a simple additional annular flow passage, or as defined flow passages that can traverse the length of walls 14, 16 in helical, serpentine or any other desired configuration depending upon the acceptable complexity of the cooling jacket and the desired amount of cooling/heating of walls 14, 16 and fuel respectively.

Pressure of fuel fed to inlets 50, 52 can be maintained by supplying fuel from a fuel supply at high pressure, or with a compressor or fuel pump or in any other manner. One aspect of the non-limiting embodiments disclosed herein is to balance the amount of heat transferred to the fuel, or increase in temperature, with a suitable pressure drop at or near the point of mixing with oxidant, to produce flash vaporization, preferably without significant exposure to conditions corresponding to the two phase dome of that fluid.

As set forth above, another aspect of an RDE is that different employment of the RDE can require a wide operability range. For example, when used with ram air, an RDE requires both a wide operability range as well as the pressure-flow balancing that are required to maintain the rotating detonation operation. One way of addressing these concerns is by controlling flow area at the exhaust end of the engine.

Figure 4:
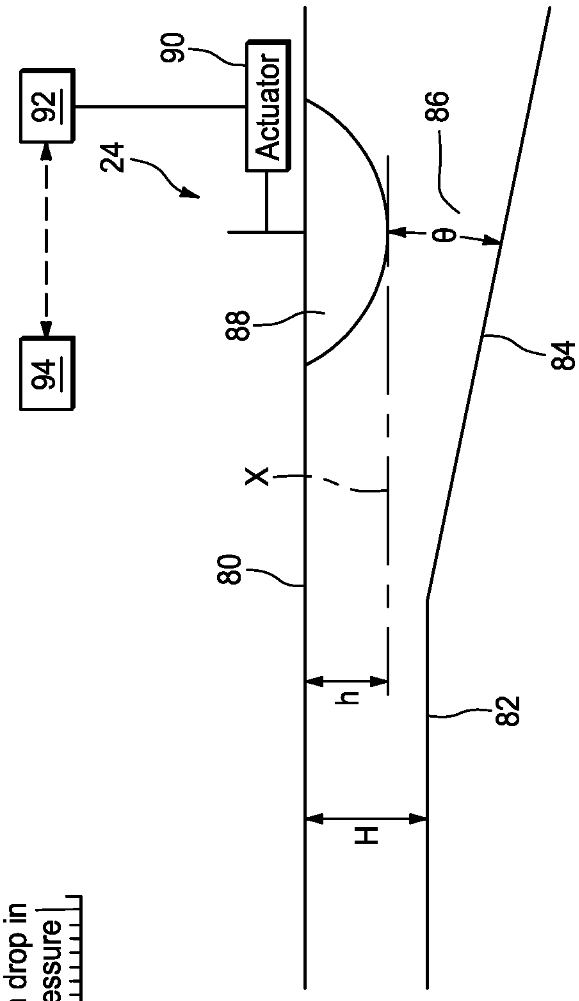
FIG. 4 schematically illustrates a non-limiting configuration of a moveable flow restriction in an outlet of a rotating detonation engine.

FIG. 4 illustrates a non-limiting configuration of a structure for providing control of flow area at the exhaust. FIG. 4 shows outlet or downstream end 24 of engine 10, schematically illustrating radially outer wall 80 and radially inner wall 82 (which can, but need not, correspond to radially outer and radially inner walls 14, 16 of other figures). In the configuration illustrated, radially inner wall 82 has a conical shape defined by a conically tapering wall section 84, for example to define an aerospike. Relative to radially outer wall 80, tapering wall section 84 defines a divergent walled flow area through the outlet. Tapering wall section 84 can define a nozzle angle, or angle with respect to a straight wall section, of between 15 and 25 degrees. Opposite this tapering wall section 84, a throat 86 can be defined by a moveable flow restriction 88. Moveable flow restriction 88 can be articulated, or mounted for movement along an axis X corresponding to flow direction through downstream end 24. Moveable flow restriction 88 is movable relative to tapering wall section 84 such that movement along axis X results in a change in flow area through throat 86 defined between tapering wall section 84 and moveable flow restriction 88.

FIG. 4 schematically shows one non-limiting configuration wherein flow restriction 88 is movably mounted to outer wall 80 and an actuator 90 is functionally connected with the movable flow restriction 88 to produce the desired movement along axis X to points of different area at throat 86. It will be appreciated that this allows for tuning of the throat area at the exhaust outlet of engine 10, which allows for desired adaptability to wide and different operating conditions while allowing maintenance of proper pressure-flow balance to sustain the rotating detonation.

Actuator 90 can be any of numerous known devices for providing the desired movement of moveable flow restriction 88. For example, actuator 90 can be an electric motor with gear mechanism to generate the desired movement, as one non-limiting example.

It should be appreciated that adjustment of flow area through throat 86 can be provided with different directions of movement of moveable flow restriction 88. As set forth above, in one configuration the moveable flow restriction 88 is moveable along axis x such that axial movement of the flow restriction relative to the tapered wall section changes the size of throat 86. Alternatively, actuator 90 could be configured to directly move moveable flow restriction 88 radially, or substantially transverse to axis x, in order to directly open or close the flow area in throat 86.

A controller 92 can be communicated with actuator 90 as well as operating parameters 94 of engine 10, for example communicated to controller 92 by sensors at various points in and/or on the engine. Controller 92 can then be programmed and configured to automatically control position of movable flow restriction 88 based upon such operating parameters in order to provide the desired wide envelope of operability while maintaining stable rotating detonation. In such a configuration, controller 92 could include a processor and stored programming configured to receive input regarding relevant operating parameters 94, and to select a suitable command for operation of actuator 90 corresponding to the input, and to execute this command to control actuator 90 accordingly.

As shown in FIG. 4, the annular detonation chamber at outlet or downstream end 24 has an annular height (H) defined between walls 80, 82. Annular height (H) increases downstream through the outlet or downstream end 24 due to the tapering of wall 82. Moveable flow restriction 88 extends from one of the inner wall structure and the outer wall structure toward the other of the inner wall structure and the outer wall structure, and has a height (h) that is less than the annular height (H). Depending upon the configuration of flow restriction 88 and actuator 90, either height (h) or the difference between (H) and (h) can be adjusted as desired.

The various configurations disclosed herein help to provide thermal management through cooling of detonation chamber walls and heating of fuel, while maintaining stable rotating detonation and accommodating a wide operability range.

One or more embodiments have been described. Nevertheless, it will be understood that various modifications may be made. For example, different fuels and/or mixer configurations could be used for coolant. Further, adjustability of a flow area through a throat exhaust area can be produced with different structures. These modifications can influence details of particular implementations, but are otherwise within the scope of this disclosure. Accordingly, other embodiments are within the scope of the following claims.

We claim:

1. A rotating detonation engine, comprising:

a radially outer wall extending along an axis;

a radially inner wall extending along the axis, wherein the radially inner wall is positioned within the radially outer wall to define an annular detonation chamber having an inlet and an outlet; wherein the outlet is defined between a static structure and a moveable flow restriction defining a flow area through the outlet, and wherein movement of the moveable flow restriction changes the flow area, wherein the static structure comprises a conical section defined on the radially inner wall and tapering to a point in a downstream direction, and the moveable flow restriction is movable along the axis and along the radially outer wall relative to the conical section, wherein the moveable flow restriction is slidable along an inner surface of the radially outer wall such that movement of the moveable flow restriction in a downstream direction relative to the conical section expands the flow area of the outlet.

2. The rotating detonation engine of claim 1, wherein movement of the moveable flow restriction from an upstream point to a downstream point relative to the conical section increases radial distance between the conical section and the moveable flow restriction in a linear relationship.

3. The rotating detonation engine of claim 1, wherein the annular detonation chamber has an annular height (H), wherein the annular height (H) increases downstream through the outlet such that the annular height (H) has a minimum height and increases downstream from the minimum height, and wherein the moveable flow restriction extends from the radially outer wall toward the radially inner wall, and has a height (h) that is less than the minimum height of the annular height (H).

4. The rotating detonation engine of claim 1, further comprising an actuator functionally connected with the movable flow restriction along the axis.

5. The rotating detonation engine of claim 4, further comprising a controller communicated with the actuator and operating parameters of the rotating detonation engine and configured to automatically control a position of the movable flow restriction based upon the operating parameters.

6. A method for controlling the flow area at an exhaust end of the rotating detonation engine of claim 1, comprising: detonating a fuel in a rotating detonation through the rotating detonation engine having the radially outer wall and the radially inner wall, wherein the radially inner wall has a conical shape defined by the conical section, wherein the radially outer wall comprises the moveable flow restriction radially opposite to and moveable relative to the conical section, and moving the moveable flow restriction relative to the conical section to change the flow area at a throat defined between the moveable flow restriction and the conical section.

7. The method of claim 6, wherein the conical section defines a nozzle angle with respect to a straight wall section of the rotating detonation engine of between 15 and 25 degrees.

8. The method of claim 6, wherein movement of the moveable flow restriction is along the axis.

9. The method of claim 6, wherein an actuator is functionally connected with the movable flow restriction, and wherein the moving step comprises controlling the actuator to produce desired movement of the moveable flow restriction along the axis.

10. The method of claim 9, wherein the actuator is an electric motor with gear mechanism to generate the desired movement.

11. The method of claim 6, wherein a controller is communicated with an actuator for the moveable flow restriction and to receive operating parameters of the rotating detonation engine, and wherein the controller is programmed and configured to automatically control position of the movable flow restriction based upon the operating parameters.

* * * * *